United States Patent
Sanger et al.

(10) Patent No.: US 6,793,698 B1
(45) Date of Patent: Sep. 21, 2004

(54) FUEL PROCESSOR REACTOR WITH INTEGRATED PRE-REFORMING ZONE

(75) Inventors: Robert J. Sanger, Chicago, IL (US); Kurt M. Vanden Bussche, Lake in the Hills, IL (US); Daniel R. Sioui, Arlington Heights, IL (US)

(73) Assignee: UOP LLC, Des Plaines, IL (US)

(*) Notice: Subject to any disclaimer, the term of this patent is extended or adjusted under 35 U.S.C. 154(b) by 652 days.

(21) Appl. No.: 09/803,283

(22) Filed: Mar. 9, 2001

(51) Int. Cl.[7] .................................................. B01J 8/00
(52) U.S. Cl. .................... 48/127.9; 48/198.3; 48/198.6; 48/198.7; 423/650; 423/651; 423/652; 423/653; 423/654; 422/191; 422/194; 422/195; 422/197; 422/200; 422/201; 422/202; 422/203; 422/211; 422/236
(58) Field of Search ...................... 48/127.9, 197 R, 48/198.1, 198.3, 198.6, 198.7; 423/650–654; 422/188–191, 193–198, 200–203, 211, 236

(56) References Cited

U.S. PATENT DOCUMENTS

| | | | |
|---|---|---|---|
| 4,696,871 A | 9/1987 | Pinto ........................... | 429/17 |
| 4,925,456 A | 5/1990 | Egglestone ................ | 48/127.9 |
| 5,516,344 A | 5/1996 | Corrigan .................... | 48/127.9 |
| 5,998,053 A | 12/1999 | Diethelm ...................... | 429/14 |
| 6,086,839 A | 7/2000 | Autenrieth et al. ......... | 423/350 |
| 6,096,286 A | 8/2000 | Autenrieth ................... | 423/651 |
| 6,123,913 A | 9/2000 | Clawson et al. ............ | 423/652 |
| 6,190,623 B1 | 2/2001 | Sanger et al. ............... | 422/192 |

FOREIGN PATENT DOCUMENTS

| | | |
|---|---|---|
| EP | 0 600 621 A1 | 11/1993 |
| EP | 0 654 838 A1 | 11/1993 |
| WO | WO 94/29013 | 12/1994 |
| WO | WO 96/32188 | 10/1996 |

OTHER PUBLICATIONS

Article "New Hydrocarbon Proton Exchange Membranes Based on Sulfonated Styrene–Ethylene/Butylene–Styrene Triblock Copolymers" by Gary E. Wnek et al., Electrochemical Society Proceedings, vol. 95–23, pp. 247–251, date unknown.

Primary Examiner—Jerry D. Johnson
Assistant Examiner—Basia Ridley
(74) Attorney, Agent, or Firm—John G. Tolomei; Frank S. Molinaro; Maryann Maas

(57) ABSTRACT

This invention relates to a compact apparatus for generating hydrogen. More particularly, this invention relates to a compact hydrogen generating apparatus suitable for use in conjunction with a fuel cell. The compact hydrogen generating apparatus comprises a fuel processor reactor having an integrated pre-reforming zone embedded within a secondary reforming zone.

8 Claims, 2 Drawing Sheets

FUEL PROCESSOR REACTOR WITH INTEGRATED PRE-REFORMING ZONE

FIELD OF THE INVENTION

This invention relates to a compact apparatus for generating hydrogen. More particularly, this invention relates to a compact hydrogen generating apparatus suitable for use in conjunction with a fuel cell.

BACKGROUND OF THE INVENTION

Fuel cells convert the chemical energy of a fuel into usable electricity via a chemical reaction and without employing combustion as an intermediate step. Like batteries, fuel cells generate DC current by means of an anode and cathode separated by an ion-transmissive medium. The most common fuel cells are based on the chemical reaction between a reducing agent such as hydrogen and an oxidizing agent such as oxygen. At the anode, hydrogen atoms are split by a catalyst into hydrogen ions (protons) and electrons. The hydrogen ions then travel through the ion-transmissive medium to the cathode. At the same time, the electrons move through an external circuit to a load and then to the cathode. There, the oxygen, hydrogen ions and electrons combine to form water.

One benefit of fuel cells is that the hydrogen they require for operation can be obtained in various ways from renewable sources. Another benefit is that the end products of the fuel cell reaction typically are mostly carbon dioxide and water. Thus, fuel cells have several environmental advantages over internal combustion engines, and therefore have been the subject of much recent research.

Fuel cells operate most efficiently on pure hydrogen. But because hydrogen can be dangerous when stored in quantity and because hydrogen has a low volumetric density compared to fuels such as natural gas, methanol, gasoline or diesel fuel, hydrogen for use in fuel cells for stationary uses generally must be produced at a point near the fuel cell, rather than being produced, stored and distributed from a centralized refining facility. In order for fuel materials other than hydrogen to be utilized by fuel cells, generally a fuel processor must be used to release the hydrogen contained in them. Suitable fuel materials for on-site processing into hydrogen include but are not limited to methanol, ethanol, natural gas, propane, butane, gasoline and diesel fuels. Such fuels are conventionally easy to store and there is a nationwide infrastructure for supplying them.

Particularly when the fuel cell is of the proton exchange membrane (PEM) type, the hydrogen gas is delivered to the fuel cell as a "wet", i.e. water-saturated, gas in order to avoid drying out the membrane. PEM fuel cells include a membrane electrode assembly (MEA) comprising a thin, proton transmissive, non-electrically conductive solid polymer membrane-electrolyte having the anode on one of its faces and the cathode on the opposite face. Among the earliest PEMs were sulfonated crosswirked polystyrenes. More recently, sulfonated fluorocarbon polymers have been employed. Such PEMs are described in G. E. Wnek et al., New Hydrocarbon Proton Exchange Membranes Based o Sulfonated Styrene-Ethylene/Butylene-Styrene Triblock Copolymers, *Electrochenical Society Proceedings*, Vol. 95–23 (1995), at pages 247 to 251.

Among the methods for producing hydrogen from a fuel material, probably the most common is synthesis gas production, achieved either via steam reforming or partial oxidation. Synthesis gas principally comprises carbon monoxide and hydrogen, but also can contain carbon dioxide and minor amounts of methane and nitrogen. In a conventional steam reforming process, a mixture of desulfurized hydrocarbon feedstock, such as natural gas, and steam are passed at high temperature and elevated pressure over a suitable reforming catalyst, such as a supported nickel catalyst, to facilitate the chemical reaction. When natural gas (methane) is the feedstock, the principal reaction is $$CH_4 + H_2O \leftrightarrows CO + 3H_2$$

The concentration of each constituent in the synthesis gas depends on the ratio of steam to hydrocarbon passing over the catalyst, and on the temperature and pressure at which the gases leave the catalyst. The steam reforming reaction is highly endothermic ($\Delta H$ =kJ/mole) that generally requires a large excess of steam and a significant heat source to move the equilibrium to the right. Fuels typically are reformed at a temperature of from about 750° to about 950° C. (1400° to 1800° F.) and a pressure of from about 100 kPa to about 7 MPa. Generally, an auxiliary fuel source, which can be either a portion of the feed or the residual fuel exiting the anode, is burned to supply by heat transfer from the hot combustion gases the heat necessary for the steam reforming reaction.

Because current fuel cells require nearly pure hydrogen to function effectively, impurities (primarily carbon monoxide) in the reformer reaction products stream must be removed. Hence, the reformer reaction products themselves are usually further subjected to the reversible "water gas shift" reaction in which carbon dioxide and hydrogen are produced from carbon monoxide and steam according to the reaction $$CO + H_2O \leftrightarrows CO_2 + H_2$$

Although the water gas shift reaction is somewhat exothermic, the steam reforming process overall remains highly endothermic.

Partial oxidation (POX) reforming also can be used to convert fuel materials into hydrogen; however, this process produces only about 75 percent as much hydrogen compared to steam reforming. The overall partial oxidation reaction for natural gas is $$CH_4 + 0.5O_2 \leftrightarrows CO + 2H_2$$

In a typical partial oxidation reformer, a fuel source and air are combined and ignited and then passed through a partial oxidation catalyst to be converted into carbon dioxide and hydrogen. Controlling the ratio of fuel source to oxygen provides a continuous and mildly exothermic reaction. Partial oxidation reforming typically occurs at a temperature of from about 6500 to about 1300° C. and a pressure of from about 1 to about 25 bar. Because the steam reforming reaction is endothermic and occurs only a high temperature, during a cold start of the reforming system, there generally is insufficient hydrogen for the fuel cells until the components of the reformer can be brought up to a sufficient operating temperature. Steam reformers generally have a poor transient response capability. Also, steam reforming processes generally work best on a comparatively large scale, where sophisticated and expensive techniques using volume-intensive equipment can be profitably employed to generate and recover heat. Steam reforming processes thus have not proved to be easily adaptable for use in small-volume, compact systems such as those destined for use in mobile vehicles.

Although partial oxidation reforming processes do not suffer from the drawbacks associated with steam reforming, nevertheless partial oxidation reformers have a different set of problems and thus do not necessarily represent a ready alternative for use in compact systems. For example, fuels produced by partial oxidation reforming contain only about 3545 percent hydrogen, compared to the approximately 70–80 percent hydrogen obtained in fuels produced by steam reforming. Also, the art associated with partial oxidation reformers is not as advanced compared to steam reformers, and it can prove sometimes difficult to find a suitable partial oxidation catalyst for a given feedstock. Thus, many designs based on modifications of steam reforming and partial oxidation processes continue to be proposed.

Systems are known in which certain reforming process components are integrated into a common module. For example, U.S. Pat. No. 5,516,344 discloses a reformer integrated with a shift converter connected downstream of the reformer. A burner associated with the unit combusts a supplied mixture, whereupon the reformer and shift converter are heated by the hot combustion gases.

U.S. Pat. No. 4,925,456 discloses a process and apparatus for producing synthesis gas that employs a plurality of double pipe heat exchangers for primary reforming in a combined primary and secondary reforming process. The primary reforming zone comprises at least one double-pipe heat exchanger-reactor and the primary reforming catalyst is positioned either in the central core or in the annulus thereof. The secondary reformer effluent is passed concurrently through whichever of the central core or annulus does not contain the primary reforming catalyst.

U.S. Pat. No. 4,696,871 discloses a method for generating electricity that employs a hydrogen-containing stream produced by a partial oxidation process using compressed air. A hydrocarbon-containing feedstock is combined with steam and air at superatmospheric pressure, with at least one of the reactants preheated by heat transfer from a heated anode waste gas stream.

EP-0654838 discloses a pre-reformer integrated into an apparatus that includes a fuel cell component, whereby during start-up an auxiliary burner is used to heat the reformer and to heat incoming air that is fed to the cell block. The amount of heat added by the auxiliary burner is insufficient to heat the cell to a minimum operating temperature, however, and combustion gas and air are fed into the apparatus and allowed to burn in a chamber adjacent to the cell block.

In a combined reformation and shift reactor disclosed in EP-0600621, the heat generated by a CO shift stage is utilized in a steam generator that is in thermal contact with the shift stage.

WO 96/32188 describes an apparatus comprising two adjacent reaction chambers separated by a heat-conducting partition that provides thermal contact between the chambers. In using the apparatus to convert methane to hydrogen, a methane/air mixture is fed to the first chamber and subjected to a pre-oxidation process using a suitable pre-oxidation catalyst. In the second chamber, a methane/steam mixture is passed through a reforming catalyst. The heat generated in the first reactor is sufficient to supply heat to the endothermic reaction in the second chamber, where heat is passed to the second chamber via the conducting partition.

WO 94/29013 discloses a compact endothermic reaction apparatus in which a plurality of metallic reaction tubes are close-packed inside a reformer vessel. Fuel is burned inside the vessel, which comprises air and fuel distribution means to avoid excessive localized heating of the reaction tubes. Heat is transferred from the flue gas vent and from the reformed gas vent of the reformer to incoming feedstock, fuel, and combustion air. The feedstock is saturated with water and preheated before entering the reaction tubes.

However, for various reasons, these and other previous designs have not proved satisfactory in obtaining an integrated compact reformer that efficiently transfers and recovers heat. The present invention has advantages over those previously disclosed. In particular, the present invention employs the combustion of anode waste gas to improve heat balance and supply heat to a pre-reforming zone, without removing heat from the secondary reforming zone. An oxidation zone is disposed in the flow path between the pre-reforming zone and the secondary reforming zone; and an upper reforming zone is placed between the pre-reforming zone and the oxidation zone to minimize overheating in the oxidation zone by consuming hydrogen in the pre-reformate prior to the oxidation zone. Heat released from the oxidation reaction imparts additional heat to the secondary reforming zone.

SUMMARY OF THE INVENTION

One aspect of the present invention relates to compact hydrogen generating apparatus suitable for use in conjunction with a fuel cell comprising a fuel processor reactor having an integrated pre-reforming zone embedded within a secondary reforming zone.

Another aspect of the present invention relates to a compact hydrogen generating apparatus that employs combustion of anode waste gas to supply heat to a pre-reforming zone embodied within a secondary reforming zone, thereby improving the overall heat balance.

Yet another aspect of the present invention relates to a compact hydrogen generating apparatus that employs an oxidation zone disposed in a flow path between a pre-reforming zone and a secondary reforming zone, whereby heat released from the oxidation reaction imparts heat to the secondary reforming zone. A problem was encountered with this combination which was unexpected. It was discovered that hydrogen produced in the pre-reforming zone when combined with an oxygen-containing stream as feed to the oxidation zone resulted in hot spots which sintered the partial oxidation catalyst at the top or inlet of the oxidation zone. The present invention places a low activity reforming catalyst zone between the pre-reforming zone and the oxidation zone which surprisingly prevented the hot spots from forming and extended the life of the partial oxidation catalyst.

Still another aspect of the present invention relates to a compact hydrogen generating apparatus that responds quickly to transient fluctuations in the power demand of a fuel cell.

A still further aspect of the present invention relates to a compact hydrogen generating apparatus that minimizes the overall size of the unit while minimizing the heat loss of the pre-reformer to the environment and from the secondary reforming zone to the pre-reforming zone.

An even further aspect of the present invention relates to a compact hydrogen generating apparatus that converts a fuel to hydrogen in a small volume while minimizing heat losses and providing a safe way to contain a partial oxidation reaction occurring at elevated temperature.

The present invention overcomes the problem of high heat losses from very small process units by disposing a pre-reforming zone and an integrated partial oxidation and secondary reforming zone within a single vessel. In this manner heat losses from high temperature surfaces are minimized, resulting in improved hydrogen purity of the hydrogen product of the fuel processor and improved overall integrated fuel processor and fuel cell efficiency as measured by the net hydrogen efficiency.

One embodiment of the invention is an apparatus for generating hydrogen from a feed stream for use in conjunction with a fuel cell. The apparatus comprises an inner vessel having a longitudinal axis, sides, a first end and a second end opposite. The inner vessel has a mixing zone, an oxidation zone, and a secondary reforming zone. The inner vessel has a layer of insulation disposed surrounding the sides of the inner vessel. A core gas conduit is located outside the inner vessel and radially distributed about the longitudinal axis. The core gas conduit has an interior passage. A catalytic combustion zone is disposed in at least a portion of the interior passage. A plurality of pre-reforming zones comprises an annular pre-reforming catalyst zone which contains a pre-reforming catalyst. Each annular pre-reforming catalyst zone has a terminal end and an annular inlet surface. The annular pre-reforming catalyst zone is disposed annularly surrounding at least a portion of the core gas conduit in thermal communication therewith. The combustion zone is adjacent the terminal end. The core gas conduit extends through the pre-reforming catalyst zone, beyond the terminal end and beyond the annular inlet surface of the annular pre-reforming catalyst zone. A fuel manifold has a fuel inlet in fluid communication therewith. An inner feed plenum is disposed on the first end of the inner vessel in fluid communication with the mixing zone and the terminal end of each annular pre-reforming catalyst zone. The core gas conduit extends through the inner feed plenum to the fuel manifold. The fuel manifold is disposed on the inner feed plenum. The interior passage of the core gas conduit is in fluid communication with the fuel manifold. An outer feed manifold is disposed further distanced from the second end of the inner vessel also partially defining a sealed effluent plenum zone enclosing each pre-reforming catalyst zone and the inner vessel. The sealed effluent plenum zone is in fluid communication with an effluent outlet. The outer feed manifold is in fluid communication with a feed inlet and the annular inlet surface of each pre-reforming catalyst zone. A flue gas manifold is disposed on the feed manifold. The flue gas manifold has a flue gas outlet in fluid communication therewith. The core gas conduit extends through the outer feed manifold to the flue gas manifold. The flue gas manifold is in fluid communication with the interior passage. An air preheating zone is disposed surrounding the effluent plenum zone and the inner feed plenum. The air preheating zone is in fluid communication with an air inlet, the inner feed plenum, and a preheater outlet. The upper reforming zone is disposed on the oxidation zone and the oxidation zone is disposed on the secondary reforming zone. The mixing zone is in fluid communication with the oxidation zone, and the oxidation zone is in fluid communication with the secondary reforming zone.

DESCRIPTION OF A PREFERRED EMBODIMENT

Figure 1:
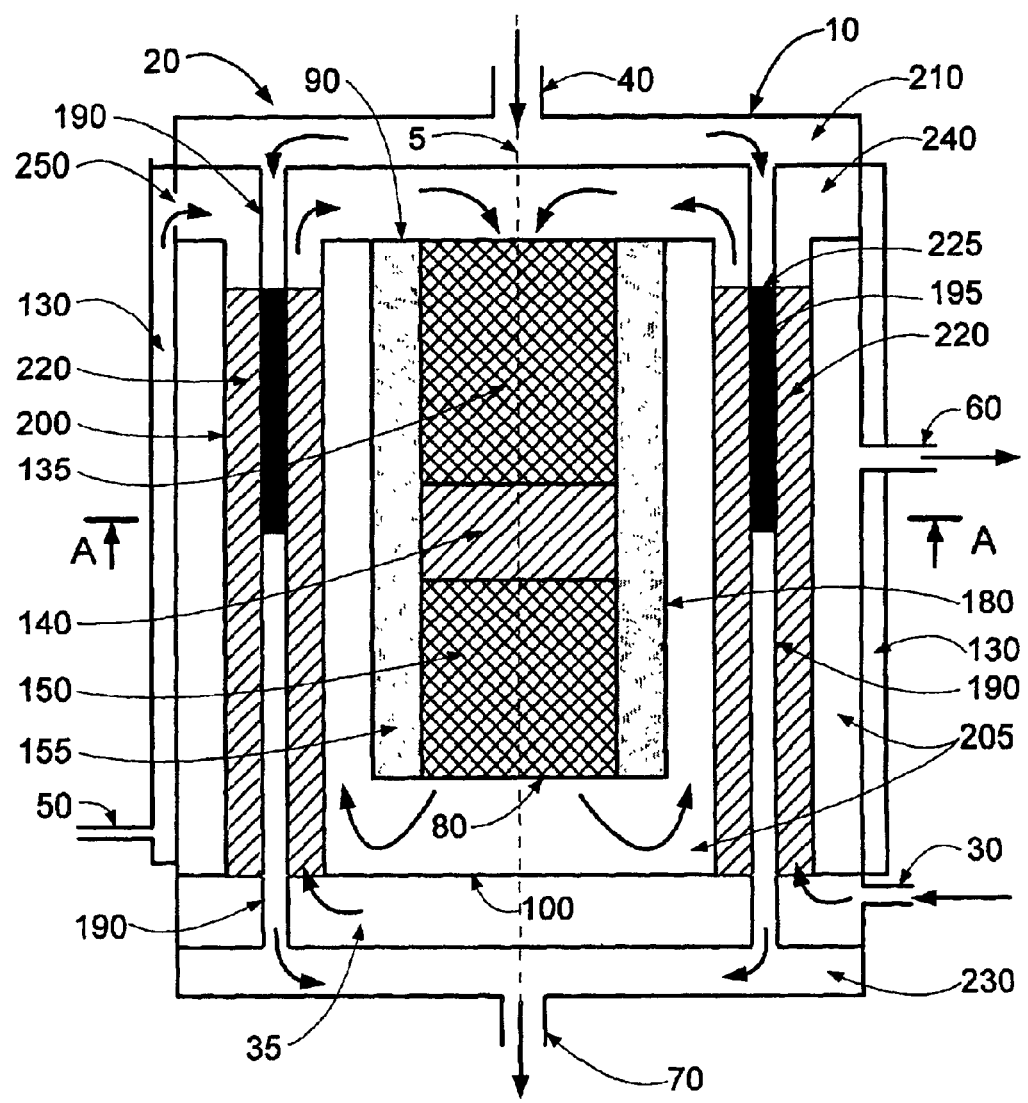
FIG. 1 is a front elevational view of a fuel processor reactor with integrated pre-reforming zone in accordance with the present invention.
Figure 2:
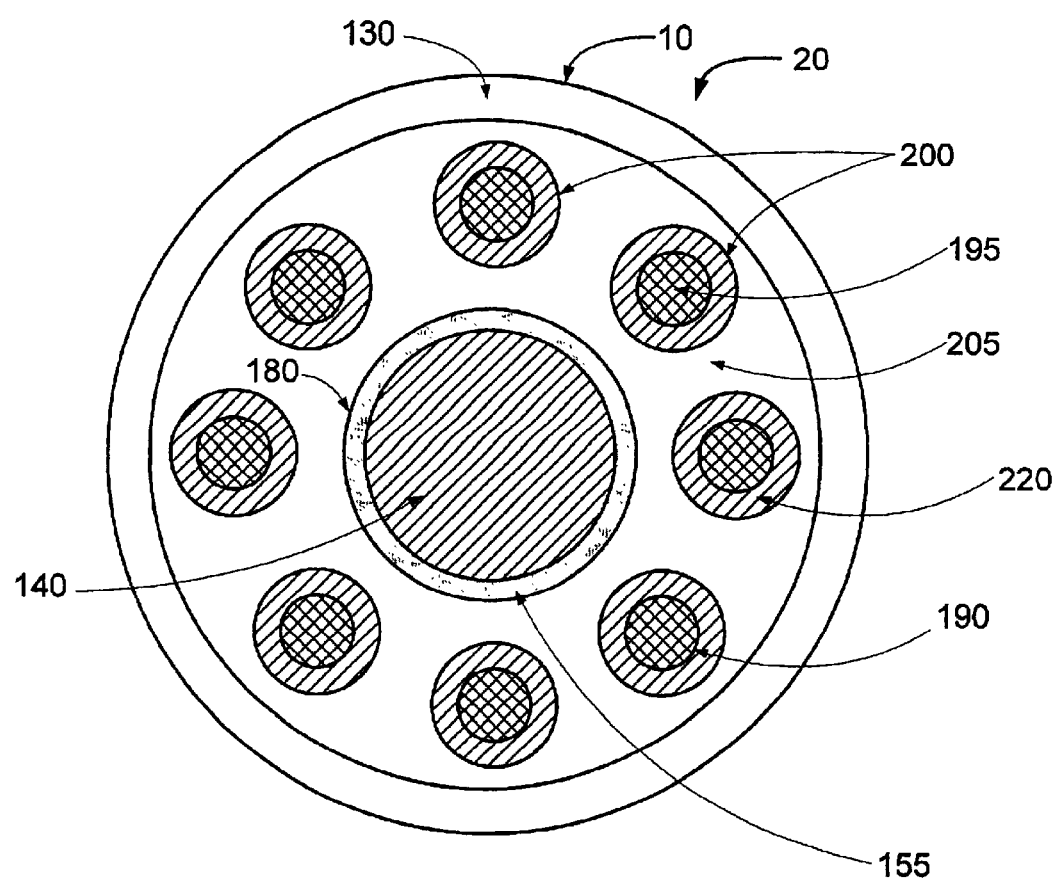
FIG. 2 is a partial top view of a fuel processor reactor of the invention that illustrates the integration of multiple pre-reforming catalyst zones.

Reference numeral 20 of FIGS. 1 and 2 generally indicates a fuel processor reactor of the invention that integrates a pre-reforming zone within a secondary reforming zone with a minimum of heat transfer between the pre-reforming zone and the secondary reforming zone. When the pre-reforming zone was disposed in a location which was removed from the oxidation and secondary reforming operations, significant heat losses were experienced which reduced the overall efficiency of the fuel processor. Because an endothermic reaction takes place in both the pre-reforming zone and the secondary reforming zones, it is important to retain as much heat in the secondary reforming zone as possible. However, care must be taken to not remove heat from the secondary reforming zone when the pre-reforming zone and the secondary reforming zone are disposed in the same vessel. Heat to maintain the reaction in the pre-reforming zone in the present invention is provided by the combustion of a mixture of anode waste gas and an oxygen-containing stream such as air, and by indirect heat transfer between the effluent from the secondary reforming zone and the pre-reforming zone. By insulating the secondary reforming zone with an effective amount of insulation and displacing the secondary reforming zone at an effective distance from the pre-reforming zone, a minimum of heat is transferred to the pre-reforming zone from the secondary reforming zone. By placing a combustion zone adjacent to the terminal end of the pre-reforming zone and employing the effluent from the secondary reforming zone to indirectly heat the inlet of the pre-reforming catalyst zone, the pre-reforming zone receives an effective amount of heat to maintain the desired level of conversion in the pre-reforming zone. One problem with the use of a pre-reforming zone in combination with an oxidation zone is that the pre-reformate withdrawn from the pre-reforming zone will comprise some hydrogen. When the pre-reformate is combined with an oxygen-containing stream, such as air at the exit conditions of the pre-reforming zone, the hydrogen will be immediately consumed and the oxidation catalyst can be damaged. Applicants surprisingly discovered that if a mixing zone is provided in which to combine the oxygen containing stream and the pre-reformate stream, and the mixing contains a low activity catalyst similar to the pre-reforming catalyst, then there was little or no damage to the oxidation catalyst.

Now referring to FIG. 1, fuel processor apparatus 20 comprises a vessel 10 having a feed inlet 30, a fuel gas inlet 40 for anode waste gas and air, an air inlet 50, an effluent outlet 60, a flue gas outlet 70, and an inner vessel 180 having a first end 90 and a bottom or second end 80, opposite along a longitudinal axis 5. The vessel 10 comprises an air preheating zone 130, a plurality of pre-reforming zones 200, a mixing zone 135, an oxidation zone 140, and a secondary reforming zone 150. Vessel 10 is generally composed of stainless steel or other metal having a sufficient strength to withstand the operating temperature and the hydrogen environment. Generally, vessel 10 is cylindrical, although other shapes are also suitable.

Vessel 10 has a feed inlet 30, through which a feed stream to be converted into hydrogen is passed to an outer feed manifold 35. Suitable feed materials include hydrocarbon-containing materials such as methanol, ethanol, propane, butane, and natural gas. Preferably, the feed material is natural gas. Natural gas generally contains impurities such as sulfur in the form of hydrogen sulfide, mercaptans, and sulfur oxides. These impurities must be substantially removed prior to introducing the feed. Removing sulfur compounds from the feed can be accomplished by any convenient means, including adsorption, chemisorption and catalytic desulfuation. Preferably, desulfurization occurs at a temperature of from about 500 to about 300° C. and a pressure of from about 100 to about 1000 kPa. Preferably, the concentration of sulfur in the feed will be reduced to a level of less than about 10 ppm per mole and most preferably to a level of less than about 1 ppm per mole. The feed to the vessel 10 is mixed or combined with steam prior to entering the vessel 10.

Water used to form the steam that is combined with the feed stream preferably will be deionized to remove dissolved metals including sodium, calcium, lead, arsenic, and anions such as chloride ions in order to prevent accelerated deactivation of the pre-reforming catalyst or other catalytic materials that may be contained in the fuel processor and fuel cell. Deionization of water can be accomplished by any convenient means. The pressure and temperature at feed inlet 30 is preferably such that the feed material/steam mixture has a steam-to-carbon ratio of from about 1:1 to about 3:1. The feed material and steam can be mixed prior to passing through feed inlet 30 or they can be mixed in-line at feed inlet 30.

After entering vessel 10, the feed/steam mixture is passed to an outer feed manifold 35 and subsequently passed through a plurality of pre-reforming zones 200, each of which consists of an outer annular pre-reforming catalyst zone 220 and a core gas conduit 190. The outer annular pre-reforming catalyst zones 220 contain a pre-reforming catalyst. The feed/steam mixture enters the annular pre-reforming catalyst zone at an inlet surface and flows axially through the annular pre-reforming catalyst bed. Heat is supplied to the annular pre-reforming catalyst bed by axial flow of a net effluent stream on the outside of the annular pre-reforming catalyst zone 220 in a direction which is co-current to the direction of the flow of the feed/steam mixture stream through the annular pre-reforming catalyst zone 220. Heat is also supplied to the annular pre-reforming catalyst zone by indirect heat exchange with combustion zone 195 disposed adjacent the terminal end of the annular pre-reforming catalyst zone 220, and the counter-current flow of flue gas through a core gas conduit 190 which is at least partially surrounded by the annular pre-reforming catalyst zone 220. Preferably, the annular pre-reforming catalyst zone contains a supported metal catalyst. Typically, the supported metal is nickel, or another Group VIII metal from the *Periodic Table of Elements*, or a combination thereof. Preferably, the other Group VIII metal includes cobalt and noble metals such as platinum, palladium, rhodium, ruthenium, and iridium, and combinations thereof. Most preferably, the supported metal includes a combination of nickel and a noble metal. Suitable catalyst supports include magnesia, magnesium aluminate, alumina, silica, or zirconia, alone or in combination. More preferably, the pre-reforming catalyst is a single metal supported on a refractory support and which contains an alkali metal promoter. Most preferably, the pre-reforming catalyst comprises nickel supported on alumina promoted by potassium.

The annular pre-reforming catalyst zone 220 is generally maintained at effective reforming conditions, and operates at a temperature of from about 300° to about 750° C. and a pressure of from about 100 to about 350 kPa. Heat is supplied to the endothermic pre-reforming reaction by passing a fuel stream comprising an anode waste gas mixture of anode waste gas and air, or an oxygen-containing stream, through the fuel gas inlet 40 and into a fuel manifold 210 and then passing the anode waste gas mixture through the core gas conduit 190. Disposed within each core gas conduit 190 is a combustion zone 195 containing an oxidation catalyst. The fuel stream or admixture of anode waste gas and air flows through the core gas conduit 190 in a direction counter-current to the direction that the feed/steam mixture flows through the annular pre-reforming catalyst zones 220 and contacts combustion zone 195 containing a conventional combustion catalyst wherein heat is generated to maintain the terminal end of the pre-reforming catalyst zone 200 at effective pre-reforming conditions. Combustion gas, or flue gas, is withdrawn from the combustion zone 195 and continues flowing toward a flue gas manifold 230. It is important that the combustion zone 195 be adjacent to the terminal end 225 of the annular pre-reforming catalyst zone 220 to maintain an effective pre-reforming zone exit temperature and thereby avoid unwanted or unfavorable reactions such as methane slippage which would reduce conversion. After transferring heat to the annular pre-reforming catalyst zone 220, the combusted anode waste gas, or flue gas, flows through flue gas manifold 230 and out of vessel 10 via flue gas outlet 70. The anode waste gas/air mixture generally is supplied to vessel 10 at a temperature of from about ambient to about 300° C. Anode waste gas produced in the fuel cell comprises hydrogen and methane and so has fuel value. Hence, the heat of combustion of the anode waste gas can be recovered via burning. Many conventional catalysts exist for burning anode waste gas in an oxygen-containing stream and are suitable for use in the present invention. Varying anode waste gas compositions can produce a combusted anode waste gas that is subject to wide swings in temperature. These variations result from changes in anode waste gas hydrogen content that occur in response to varying electrical power demand. To provide for a more constant combusted anode waste gas temperature, the anode waste gas is combusted with an excess of air. The heat provided by the combustion of anode waste gas provides a means for heating the annular pre-reforming catalyst zones 220. It is preferred to provide a sufficient amount of excess air to combust the anode waste gas to maintain the combustion temperature below about 750° C.

In the annular pre-reforming catalyst zone 220, the feed/steam admixture is at least partially converted to produce a pre-reforming effluent stream. It is important that the plurality of core gas conduits 190 extend beyond the annular pre-reforming catalyst zones 220 to provide a disengaging zone and to minimize the heat transfer between the annular pre-reforming catalyst zones 220 and the incoming feed gas in the outer feed manifold 35, or with the incoming fuel gas admixture of anode waste gas and air from the fuel manifold 210 which would tend to cool the pre-reforming catalyst zones 220. The pre-reformer effluent is withdrawn from the plurality of annular pre-reforming catalyst zones 220 and passed to the inner feed plenum 240 wherein the pre-reforming effluent stream is admixed with a preheated air stream introduced from the air preheating zone 130 via a preheater inlet 250. An oxygen-containing stream, or air stream, is introduced to vessel 10 in the air inlet 50 which is in fluid communication with the air preheating zone 130. The air stream introduced via the air inlet 50 is preheated in the air preheating zone 130, shown herein as an air jacket surrounding vessel 10, to provide the preheated air stream which will be admixed with the pre-reforming effluent stream to provide a reformer zone feed stream in the inner feed plenum 240 at a first end 90 of the inner vessel 180. The reformer zone feed stream is passed to a mixing zone 135 at effective conditions to provide a controlled zone for the consumption of any hydrogen generated in the annular pre-reforming catalyst zone 220. By placing a low activity reforming catalyst in mixing zone 135, above the oxidation zone 140, it is believed that some steam reforming will occur which further assists in maintaining a maximum temperature in the vessel within an effective range for the oxidation reaction in the oxidation zone 140 without requiring exotic metallurgy for the vessel 10. The inner vessel 180 comprises a mixing zone 135 disposed over a partial oxidation zone 140 which is disposed over a secondary reforming zone 150. The inner vessel 180 is surrounded by a layer of insulation 155 disposed on the sides thereof to retain heat produced during the exothermic oxidation reaction. The reforming zone feed stream cascades through the mixing zone 135 to produce a first reformate stream which in turn is passed to the oxidation zone 140 to produce a partial oxidation zone effluent, which is in turn passed to the secondary reforming zone 150 to produce a net reformate effluent stream. The net reformate effluent stream is withdrawn from the bottom or second end 80 of the inner vessel 180 into an effluent plenum zone 205. The net reformate effluent stream then flows co-currently with respect to the direction of the flow of the feed material/steam, and contacts the outside of the plurality of annular pre-reforming catalyst zones 220 to provide some heating to the pre-reforming zones 200 while minimizing the loss of heat from the secondary reforming zone 150. The net reformate effluent stream is withdrawn from the effluent plenum zone 205 via effluent outlet 60, at a point below the annular pre-reforming catalyst zone 220 outlet to avoid cooling the outlet of the annular pre-reforming catalyst zone 220. The partial oxidation, or oxidation reaction in the oxidation zone 140 is performed over a suitable oxidation catalyst to produce an oxidation zone effluent stream.

The net reformate stream comprises carbon monoxide which can be harmful to some fuel cell systems. Therefore, where carbon monoxide must be removed, the net reformate stream at effective shift conditions and in the presence of water or steam is passed to a water gas shift zone (not shown) which results in the conversion of the carbon monoxide to carbon dioxide in a water gas shift effluent. If further oxidation of carbon monoxide is required, the water gas shift effluent is passed to a preferential oxidation zone (not shown) to further selectively oxidize carbon monoxide to carbon dioxide. Air preheating zone 130 fluidly communicates with air inlet 50 and the inner feed plenum 240 via preheater inlet 250.

Oxidation zone 140 is packed with a suitable oxidation catalyst. Catalyst compositions suitable for catalytic oxidation of hydrocarbons are well known, as for example those catalysts taught in U.S. Pat. No. 4,691,071 which is incorporated herein by reference. Preferably, the active component of the oxidation catalyst is selected from the group consisting of a metal selected from a Group VIII metal deposited onto a ceramic support.

Although the use of an oxidation process in a fuel processor results in a lower efficiency, it allows improved start-up performance relative to a steam reforming process which is generally slow to start up. The oxidation zone effluent is passed first through the lower or secondary reforming zone 150, which is typically packed with a suitable reforming catalyst, and then through a sealed effluent plenum zone 205, following which the net reformate exits through effluent outlet 60. The sealed effluent plenum zone 205 encloses the plurality of pre-reforming zones and an inner vessel comprising the mixing zone 135, the oxidation zone 140, the secondary reforming zone 150, and the layer of insulation 155. In the sealed effluent plenum zone 205 the net reformate flows in the same direction as the feed/steam mixture in the annular pre-reforming catalyst zones 220 and is withdrawn from the sealed effluent plenum zone 205 at a point adjacent to the terminal end 225 of the annular pre-reforming catalyst zone 220. The reforming catalysts employed in the secondary reforming zone 150 can be the same or different substance as the reforming catalysts employed in each of the annular pre-reforming catalyst zone 220 or the mixing zone 135. The catalyst zones of the present invention may be disposed within the individual catalyst zones as fixed beds of pelleted or extruded catalyst, supported by screens or sieve plates, or disposed as catalyst monoliths. Generally, the pre-reforming and secondary reforming and mixing zone catalysts are of the same composition.

As mentioned above, the oxidation effluent supplies direct heat via convection and conduction to the endothermic reaction that occurs in the secondary reforming zone 150. As the net effluent stream flows through the sealed effluent plenum zone 205, it provides some heat radially to the inlet of the annular pre-reforming catalyst zones 220 at the bottom 100 of sealed effluent plenum zone 205. Each annular pre-reforming catalyst zone 220 is heated at its terminal end by indirect heat transfer from the combustion of anode waste gas and an oxygen-containing steam mixture in combustion zone 195. The combustion zone 195 is disposed in the core gas conduit 190, adjacent to the terminal end of the annular pre-reforming catalyst zone As 220. This heat transfer scheme maximizes energy efficiency and heat recovery without taking heat from the secondary reforming zone 150 which is insulated from the sealed effluent plenum zone 205 by a surrounding layer of insulation 155 covering the sides of the inner vessel 180. The secondary reforming zone effluent exits vessel 10 via effluent outlet 60, where it has a temperature of about 400–500° C. and a pressure of about 100–1000 kPa and comprises about 40–55 mole percent hydrogen, 4–10 mole percent carbon monoxide, 4–10 mole percent carbon dioxide, 15–20 mole percent water, 0.1–0.6 mole percent unconverted methane, and the balance nitrogen.

Referring to FIG. 2, a partial top of the fuel processor apparatus 20 is shown at Section A—A. of FIG. 1. The vessel 10 of fuel processor apparatus 20 comprises an air preheating zone 130 which surrounds the sealed effluent plenum zone 205. Disposed within the sealed effluent plenum zone 205 are a plurality of pre-reforming zones 200 located at a distance from an inner vessel 180. The inner vessel is generally cylindrical with side walls being surrounded by a layer of insulation 155 and enclosing an oxidation zone 140. Each of the pre-reforming zones 200 has an outer annular pre-reforming catalyst zone 220 annularly surrounding a core gas conduit 190. The core gas conduit 190 comprises a combustion zone 195 containing a combustion catalyst disposed adjacent to the terminal end of the pre-reforming catalyst zone 220.

The integrated fuel processor of the invention converts fuel to hydrogen using only a small amount of weight and space and with minimum pressure drop and heat loss due to relatively short flow paths and efficient heat transfer between the various streams. The apparatus of the invention integrates a pre-reforming zone within a secondary reforming zone and utilizes an intermediary oxidation zone, thereby providing comparatively high dynamics and rapid warm-up behavior. The fuel processor of the invention is especially desirable for use in stationary applications in fuel cell systems for residential and commercial use.

All documents, e.g., patents, journal articles and textbooks, cited above or below are hereby incorporated by reference in their entirety.

One skilled in the art will recognize that modifications may be made in the present invention without deviating from the spirit or scope of the invention. The invention is illustrated further by the following examples, which are not to be construed as limiting the invention in spirit or scope to the specific procedures or compositions described therein. The following examples are based on engineering design simulation based pilot plant data for the operation of a fuel processor for converting natural gas into a hydrogen containing stream for use in a fuel cell. The fuel processor comprises a pre-reforming zone, and a combined partial oxidation and secondary reforming zone.

EXAMPLE I

A fuel processor system having a separate pre-reforming zone as disclosed in U.S. Pat. No. 6,190,623 is represented as Case A. The fuel processor contains a pre-reforming zone, a combined partial oxidation zone, and a burner zone. The pre-reforming zone contains a reforming catalyst representing about 5–10 weight percent of the total catalyst in the fuel processor. The pre-reforming zone is operated at effective pre-reforming conditions, including a space velocity of about 10,000–15,000 $hr^{-1}$. The combined partial oxidation zone comprises a mixing zone, a partial oxidation zone, and a secondary reforming zone and contains 75–90 percent of the total catalyst in the fuel processor. The partial oxidation zone contains oxidation catalyst, representing 5–10 weight percent of the total catalyst, and the secondary reforming zone contains a reforming catalyst representing about 60–70 weight percent of the total catalyst in the fuel processor. The partial oxidation and secondary reforming zones are operated at respective effective conditions, including a space velocity of about 10,000 to 15,000 $hr^{-1}$ in the partial oxidation zone, and about 1,000 to about 2,000 $hr^{-1}$ in the secondary reforming zone. In order to avoid damage to the oxidation catalyst and according to the present invention, the mixing zone contains reforming catalyst in an amount representing about 10–15 weight percent of the total fuel processor catalyst. The mixing zone conditions include a space velocity of about 5,000 o about 10,000 $hr^{-1}$. The burner zone contains a combustion catalyst representing about 5–10 weight percent of the total fuel processor catalyst and is operated at effective combustion conditions including a space velocity of about 5,000 to 10,000 $hr^{-1}$. The heat losses from each component of the fuel processor; that is, the pre-reformer, the combined partial oxidation and secondary reforming zone, the combustion zone for combustion of the anode waste gas, and the burner transfer line are shown as Case A in Table 1. The anode waste gas production from the fuel cell is based on the fuel cell consumption of about 75 percent of the hydrogen passed to the anode side of the fuel cell. As shown in Table 1, the natural gas feed stream passed to the fuel processor has a fuel value of about 49,150 kJoules/hr and is equivalent to the requirements of a 4 kWatt per hour net production of electricity. In the integrated system, the fuel processor produces a hydrogen stream comprising about 40.4 mole percent hydrogen on a dry basis. The net hydrogen efficiency for the system in Case A is about 57.3 percent. The combined heat losses for the separate pre-reformer scheme amount to about 6,890 kJoules/hr wherein most of the heat is lost from exposed high temperature surfaces in the pre-reformer and in the combined partial oxidation and secondary reforming zones.

EXAMPLE II

A fuel processor system based on the present invention is represented as Case B. The Case B fuel processor system comprises a pre-reforming zone disposed in 20 the same vessel as the partial oxidation and secondary reforming zones in combination with a fuel cell. The pre-reforming, partial oxidation, and secondary reforming zones of Case B contain the same amount and type of catalyst in each of the respective zones as in Case A. The heat losses from each component of the fuel processor; that is, the pre-reforming zone, the combined partial oxidation and secondary reforming core zone, and the combustion zone are shown Case B in Table 1. As in Example I, the anode waste gas production from the fuel cell is based on the fuel cell consumption of about 75 percent of the hydrogen passed to the anode side of the fuel cell. As in Case A of Example I, the natural gas feed stream passed to the fuel processor in Case B has a fuel value of about 49,150 kJoules/hr. Heat losses in the present invention represented by Case B is reduced to about 3,790 kjoules, which is about 55 percent less than the integrated process of Case A. Surprisingly, the integrated system of the present invention produces a higher purity hydrogen stream comprising about 44.3 mole percent hydrogen, on a dry basis, and the net hydrogen efficiency for the system in Case B is about 61.1 percent. It is believed than this net hydrogen efficiency improvement resulted from the reduction of the heat losses from high temperature surfaces. In Case B, the hydrogen purity produced is greater than that of in Case A because high temperature heat losses from the partial oxidation zone are significantly reduced which lowers the requirement for air in the partial oxidation zone and results in less hydrogen dilution.

EXAMPLE III

The fuel processor of the present invention as represented in Case B of Example II is integrated with a fuel cell which uses 80 percent of the hydrogen passed to the anode side of the fuel cell. The results of the higher efficiency fuel cell are presented as Case C in Table 1 indicate that the integrated system of the present invention has a net hydrogen efficiency of about 65 percent.

TABLE 1

Comparison of Integrated Fuel Processor Systems

|  | Case A | Case B | Case C |
| --- | --- | --- | --- |
| Feed, kJoules/hr (50 SCF/D) | 49,150 | 49,150 | 49,150 |
| Heat Losses, kJoules/hr | 6,890 | 3,790 | 3,790 |
| Pre-reforming Zone | 970 | 870 | 870 |
| Combined Partial Oxidation & Reforming | 3850 | 1780 | 1780 |
| Combustion Zone | 1035 | 845 | 845 |
| Burner Transfer Line | 1035 | 290 | 290 |
| Gross Hydrogen Efficiency, % |  |  |  |
| Hydrogen Use in Fuel Cell, % | 75 | 75 | 80 |
| Net Hydrogen Efficiency, % | 57.3 | 61.1 | 65.1 |
| Hydrogen Product Purity, mol-% |  |  |  |

The invention and the manner and process of making and using it are now described in such full, clear, concise and exact terms as to enable any person skilled in the art to which it pertains, to make and use the same. Although the foregoing describes preferred embodiments of the present invention, modifications may be made therein without departing from the spirit or scope of the present invention as set forth in the claims. To particularly point out and distinctly claim the subject matter regarded as invention, the following claims conclude this specification.

We claim:

1. An apparatus for generating hydrogen from a feed stream for use in conjunction with a fuel cell, said apparatus comprising:

an inner vessel having a longitudinal axis, sides, a first end and a second end opposite, said inner vessel having a mixing zone, an oxidation zone, and a secondary reforming zone, said inner vessel having a layer of insulation disposed surrounding the sides of the inner vessel;

a core gas conduit located outside the inner vessel and radially distributed about the longitudinal axis, said core gas conduit having an interior passage and having a catalytic combustion zone disposed in at least a portion of the interior passage;

a plurality of pre-reforming zones, each of said pre-reforming zones comprising an annular pre-reforming catalyst zone containing a pre-reforming catalyst, each annular pre-reforming catalyst zone having a terminal end and an annular inlet surface, said annular pre-reforming catalyst zone disposed annularly surrounding at least a portion of the core gas conduit in the thermal communication therewith, said combustion zone being adjacent the terminal end, said core gas conduit extending through the pre-reforming catalyst zone beyond the terminal end and beyond the annular inlet surface of the annular pre-reforming catalyst zone;

a fuel manifold having a fuel inlet in fluid communication therewith;

an inner feed plenum disposed on the first end of the inner vessel in fluid communication with the mixing zone and the terminal end of each annular pre-reforming catalyst zone, the core gas conduit extending through the inner feed plenum to the fuel manifold, said fuel manifold being disposed on the inner feed plenum, said interior passage of the core gas conduit being in fluid communication with the fuel manifold;

an outer feed manifold disposed further distanced from the second end of the inner vessel also partially defining a sealed effluent plenum zone enclosing each pre-reforming catalyst zone and the inner vessel, said sealed effluent plenum zone being in fluid communication with an effluent outlet, the outer feed manifold being in fluid communication with a feed inlet and the annular inlet surface of each pre-reforming catalyst zone;

a flue gas manifold disposed on the feed manifold, said flue gas manifold having a flue gas outlet in fluid communication with the core gas conduit extending through the outer feed manifold to the flue gas manifold, said flue gas manifold being in fluid communication with the interior passage; and an air preheating zone disposed surrounding the effluent plenum zone and the inner fed plenum, said air preheating zone being in fluid communication with an air inlet, the inner feed plenum, and a preheater outlet, wherein the upper reforming zone is disposed on the oxidation zone and the oxidation zone is disposed on the secondary reforming zone, the mixing zone being in fluid communication with the oxidation zone and the oxidation zone being in fluid communication with the secondary reforming zone.

2. The apparatus of claim 1 wherein the mixing zone comprises a reforming catalyst.

3. The apparatus of claim 1 wherein the pre-reforming catalyst is a supported metal catalyst selected from the group consisting of nickel, cobalt, platinum, palladium, rhodium, ruthenium, iridium and mixtures thereof on a refractory support.

4. The apparatus of claim 1 wherein pre-reforming catalyst comprises nickel supported on an alumina promoted by potassium.

5. The apparatus of claim 1 wherein tie inner vessel and the plurality of pre-reforming zones are cylindrical.

6. The apparatus of claim 1 wherein the layer of insulation is effective to minimize heat transfer from the secondary reforming zone to the pre-reforming catalyst zone.

7. The apparatus of claim 1 wherein the effluent outlet is disposed adjacent to the inner feed plenum.

8. The apparatus of claim 1 wherein the terminal end of each pre-reforming catalyst is disposed farther distanced from the inner feed plenum.

* * * * *

UNITED STATES PATENT AND TRADEMARK OFFICE
CERTIFICATE OF CORRECTION

PATENT NO.   : 6,793,698 B1
DATED        : September 21, 2004
INVENTOR(S)  : Robert J. Sanger et al.

It is certified that error appears in the above-identified patent and that said Letters Patent is hereby corrected as shown below:

Column 14,
Line 8, replace "fed" with -- feed --.

Signed and Sealed this

Fifth Day of April, 2005

JON W. DUDAS
*Director of the United States Patent and Trademark Office*